Feb. 2, 1971   A. A. GAVRILKIN ET AL   3,560,097
PHOTOELECTRIC MICROSCOPE
Filed May 3, 1967   8 Sheets-Sheet 1

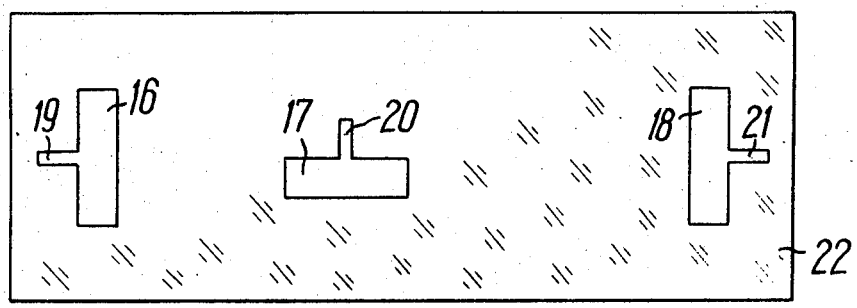
FIG. 4
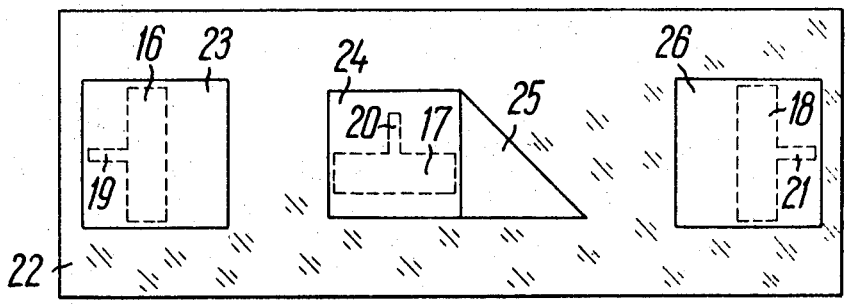
FIG. 5-a
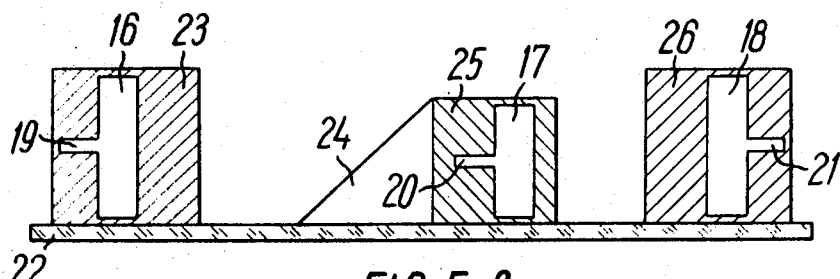
FIG. 5-B

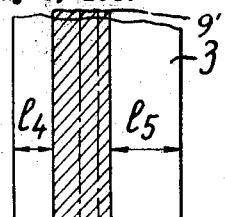
FIG. 9
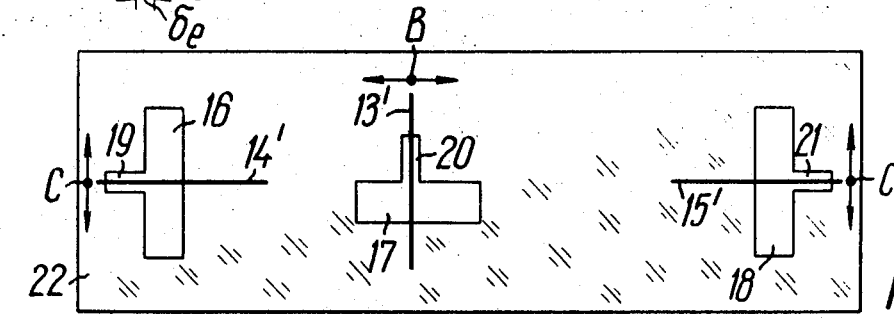
FIG. 10
FIG. 11
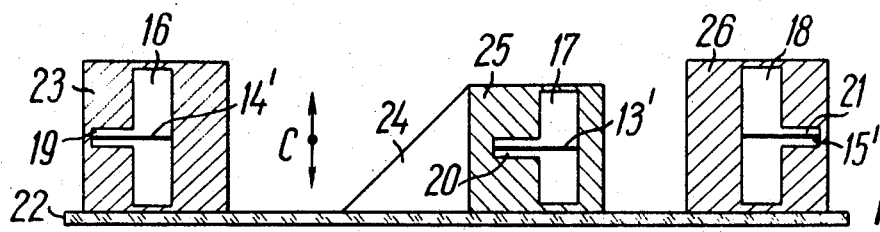
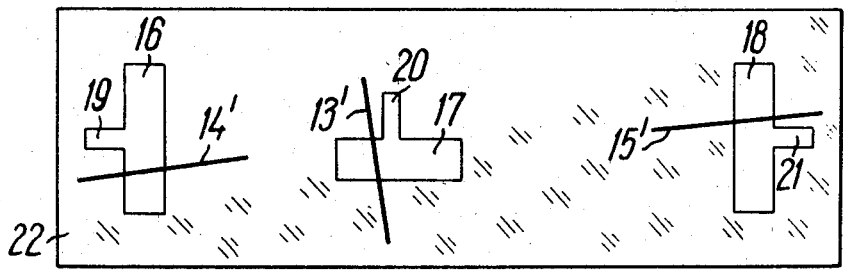
FIG. 13
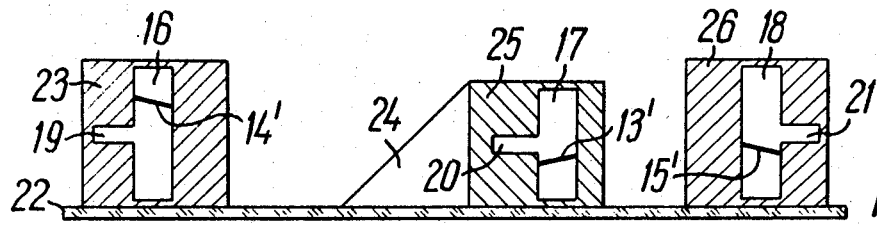
FIG. 14

United States Patent Office

> 3,560,097
> Patented Feb. 2, 1971

3,560,097
PHOTOELECTRIC MICROSCOPE
Anatoly Alexandrovich Gavrilkin, Ulitsa Yanki Kupaly 17/30, kv. 112, and Jakov Aronovich Raikhman, Leninsky prospekt 53, kv. 78, both of Minsk, U.S.S.R.
Filed May 3, 1967, Ser. No. 635,730
Int. Cl. G01b 11/04
U.S. Cl. 356—170                                   3 Claims

ABSTRACT OF THE DISCLOSURE

A photoelectric microscope for measuring the position of at least one reference line or dash with respect to its optical axis is characterized in that its optical axis is not the center of oscillations of a scanner but the axis of a constructional base element, i.e. of a slit diaphragm, the position of the reference line or dash being determined relative to the borders of said slit diaphragm by the relation between time intervals in a signal characteristic of the superimposed and time-base scanned image of a mask with the base slit diaphragm and the image of the reference line or dash sighted in the plane of this mask with the diaphragm. The photoelectric microscope determines with high accuracy not only the moment of alignment with the axis of the reference line or dash, but it also measures the position of the reference dash relative to the optical axis of the photoelectric microscope with further presenting of the output information in digital form or in linear units, for which purpose the width of the slit diaphragm is used as a scaling element.

---

The present invention relates to photoelectric measuring devices and more particularly to photoelectric microscopes for determining the position of the axis of the reference mark (line or dash) in the field of view of the photoelectric microscope with respect to the optical axis thereof and for making said axis coincide with the axis of the reference mark.

Known in the art are photoelectric microscopes for determining the position of the axis of one reference line, in which the image of a luminous slit is scanned in the plane of the reference line or the image of the reference line by a mirror vibrator at least before one photocell with a slit diaphragm and time intervals between the output pulses of the photocell are measured which are indicative of the position of the axis of the reference line with respect to the optical axis of the photoelectric microscope.

In the above mentioned photoelectric microscopes the optical axis is the center of sine oscillations of the vibrator and therefore such microscopes are deficient due to the instability of the optical axis caused by time, temperature and parametric drifts of the center of vibrator oscillations. This fact considerably reduces the accuracy of said photoelectric microscopes.

Moreover said photoelectric microscopes are capable of being aligned with the axis of one reference line only, i.e. the photoelectric microscope orients the body whose surface bears reference lines with respect to one linear coordinate only. In many cases, however, it is required to effect alignment with a reference mark, which incorporates three reference lines or dashes made on the surface of the body, one of said reference lines being perpendicular to the others, so that said body be oriented with respect to two linear and one angular coordinates, i.e. that the body be oriented to the base position, determined by the three optical axes of the photoelectric microscope.

To determine the position of the reference mark the photoelectric microscope should have three optical axes. It is difficult, however, to orient the body in a plane with respect to three coordinates, viz., two linear and one angular coordinates; in other words, to effect alignment with the reference mark by means of the above said photoelectric microscopes which have only one optical axis, since in this case it becomes necessary to employ three separate photoelectric microscopes and combine them into a single unit so that to each reference line there should correspond the optical axis of one respective photoelectric microscope. Such a solution, however, does not ensure a constant setting of the base position determined by the position of the optical axes of the photoelectric microscope, the unit incorporating three microscopes being unduly complicated.

Said photoelectric microscopes are essentially zero-type instruments, i.e. they are capable of determining with high precision only the moment of alignment with the axis of the reference line or dash, while the determination of the reference line position in the field of view of the microscope with respect to the optical axis requires either the employment of a special reading device, the presence of an operator being prerequisite for such measurements, or a preliminary conversion of the output information of the electronic measuring device of the microscope into linear units, in which case no high precision of measurement can be ensured.

All these disadvantages materially limit the scope of application of said photoelectric microscopes in automatic and programmed devices.

An object of the present invention is to provide a photoelectric microscope for determining the position of at least one reference line or dash with respect to the optical axis, said microscope having a constant optical axis independent of the stability of the center of oscillations of the vibrator or the shape of its oscillations.

Another object of the present invention is to provide a photoelectric microscope which will also ensure the determination of the position of the reference mark made on the surface of a body and incorporating three reference lines or dashes, one of them being perpendicular to the other two so that said body could be oriented in a plane with respect to three coordinates to assume its base position determined by the optical axes of the photoelectric microscope.

Still another object of the present invention is to provide a photoelectric microscope which will make it possible to determine not only the moment of alignment of the axis of the photoelectric microscope with the axis of the reference line or dash, but also to determine the distance between the axis of the reference element and the optical axis, the output information being represented in linear units.

With said and other objects in view in the photoelectric microscope, in accordance with the present invention, to ensure the stability of the optical axis, along the light path behind the objective there is installed at least one diaphragm provided with a base slit, the axis thereof serving as the optical axis, a second objective being installed behind said diaphragm to produce a superimposed image of the diaphragm with the base slit and of the reference line or dash in the plane of the slit diaphragm of the photocell with the purpose of measuring time intervals and relations therebetween, said time intervals being those between the pulses from the borders of the base slit and of the image of the reference line or dash when this superimposed image is scanned before the photocell with the slit diaphragm.

To determine the position of the reference mark comprising mutually perpendicular reference lines or dashes by two linear coordinates and one angular coordinate, it is necessary to install three diaphragms, their base slits being arranged so that the axis of one of them be perpendicular to the axes of the remaining two of said diaphragms, a prismatic image-turning system being installed behind said diaphragms in front of said second objective, said system being constituted by four rectangular prisms, two of said prisms serving to transfer the images of the two diaphragms with parallel axes of the base slits together with the images of the reference lines or dashes into the perpendicular plane, and other two prisms serving to transfer the image of the third diaphragm, whose base slit axis is perpendicular to those of the aforesaid base slits of the diaphragms together with the image of the reference line or dash into said perpendicular plane and simultaneously turn said image through 90°, this being necessary in order to effect scanning of superimposed images of the three diaphragms with the base slits and of the reference lines or dashes in front of photocells with slit diaphragms by means of only one mirror vibrator in one direction only.

For an automatic conversion of the output information of the electronic measuring device into linear units when measuring time intervals between pulses in the electronic measuring device in discrete form, it is expedient to provide a circuit adapted to determine the value of one measuring pulse in linear units, said circuit comprising a scaling circuit, the input of said scaling circuit being fed with a shaped pulse from one base slit of a diaphragm, said shaped pulse being a pack of measuring pulses, and a counter whose input is fed with the scaling circuit overflow pulses, the scaling factor of said scaling circuit being equal to the width of the diaphragm base slit transferred into the plane of the reference element, and the number of pulses fed to the counter input being equal to the number of measuring pulses within one unit length.

Other objects and advantages of the present invention will become apparent upon consideration of the description of exemplary embodiments thereof and the accompanying drawings, wherein:

FIG. 1 diagrammatically shows one possible embodiment of a photoelectric microscope, according to the invention;

FIG. 4 shows three diaphragms with base slits made in a single mask and installed in the microscope as shown in FIG. 3;

Figure 1:
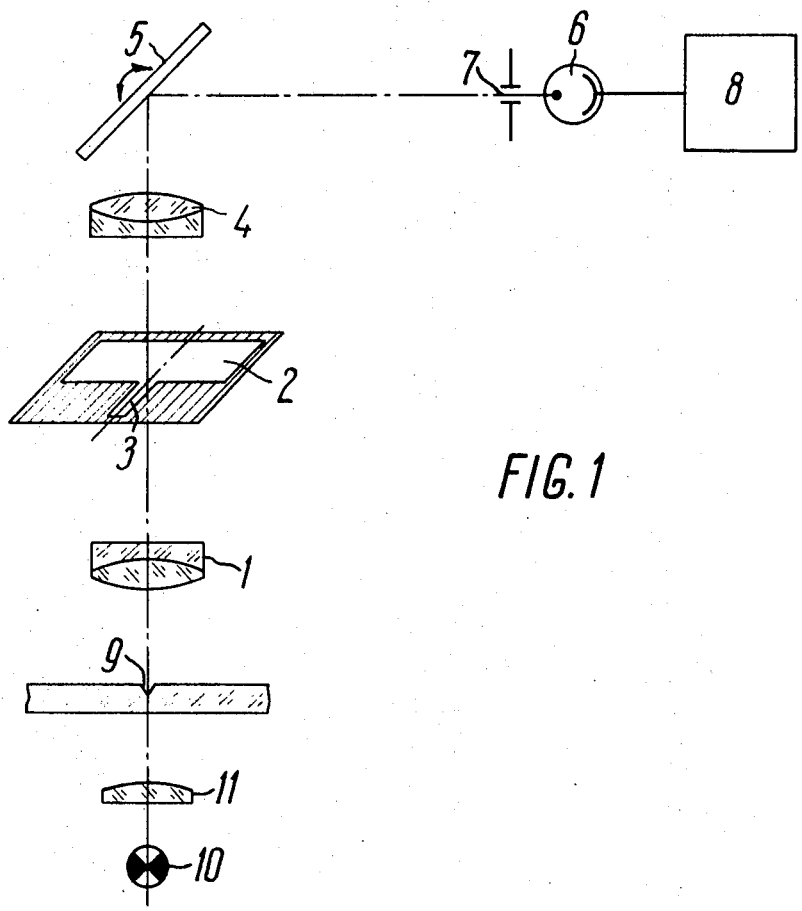
Figure 3:
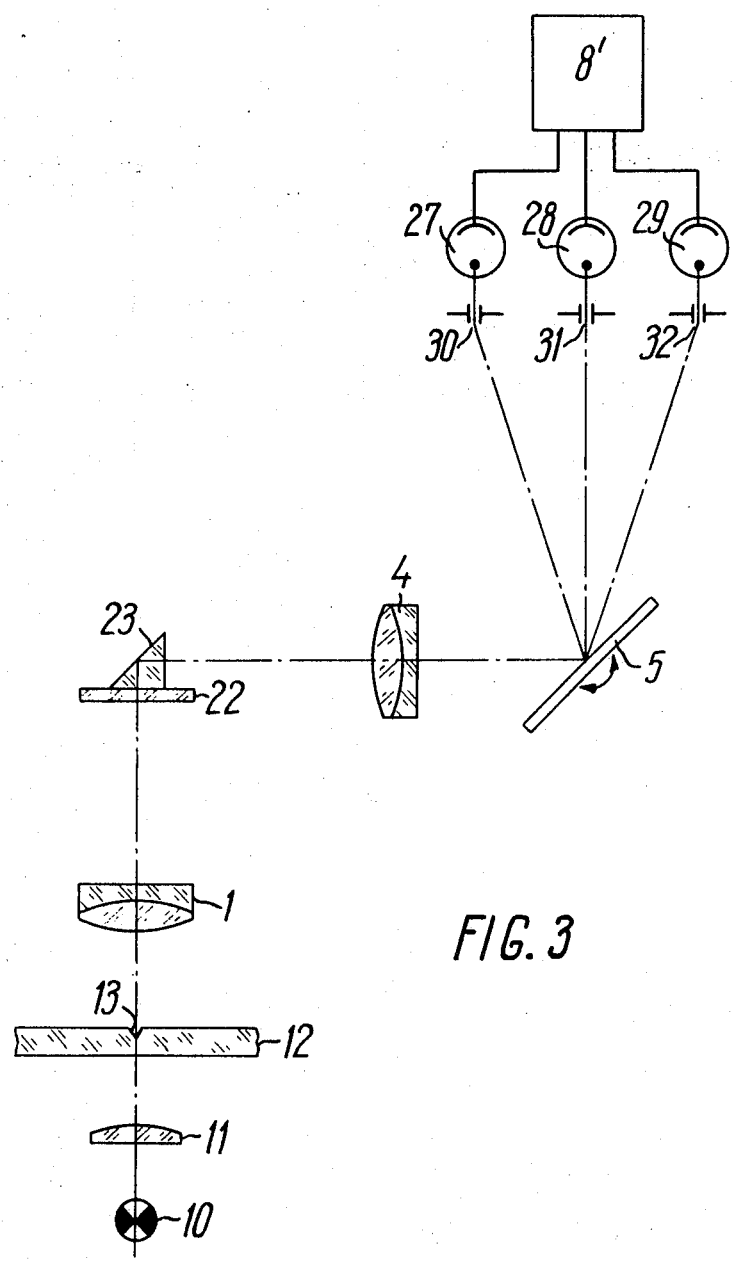
FIG. 3 shows diagrammatically another possible embodiment of the photoelectric microscope of the invention.
Figure 6:
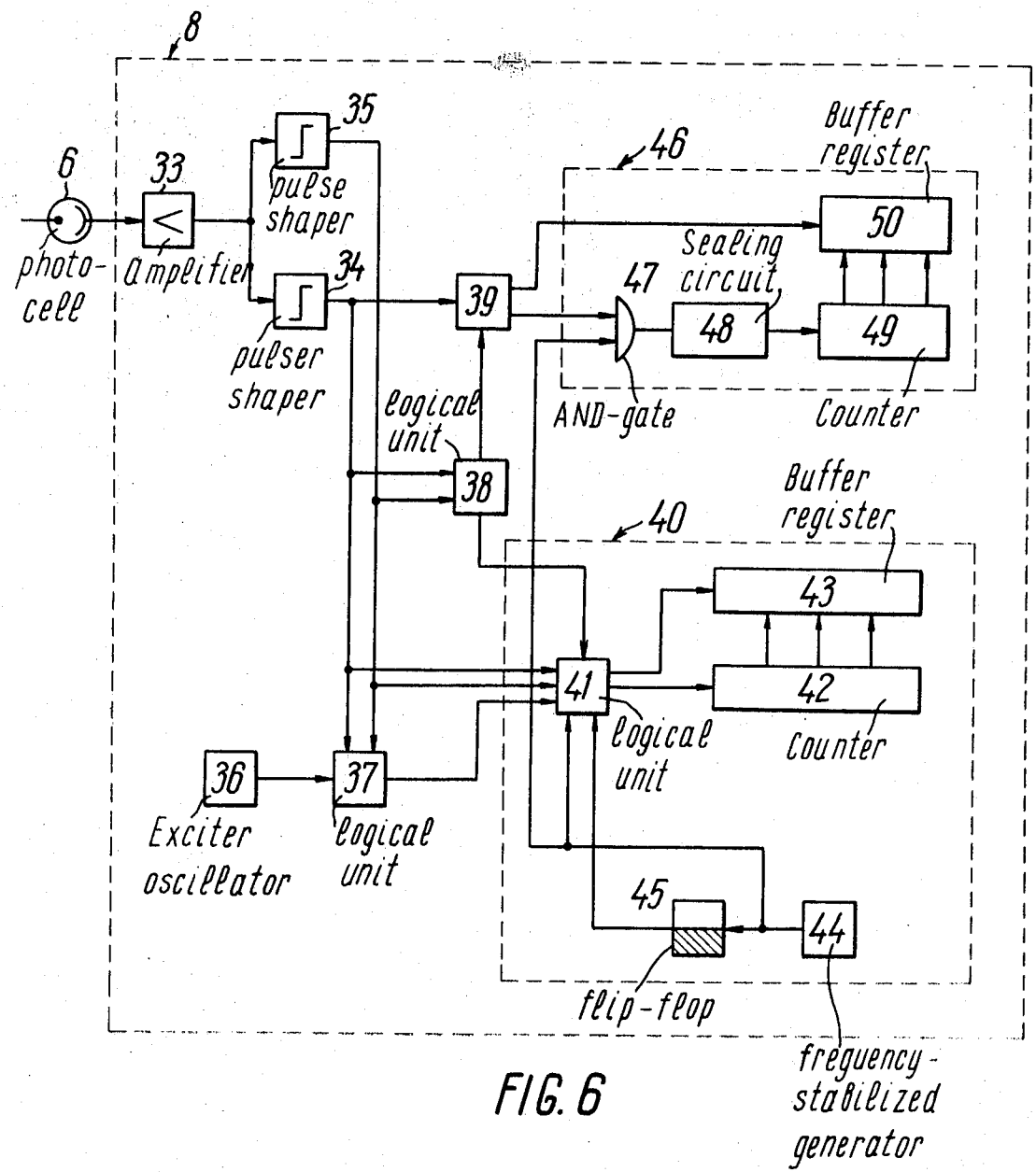
Figure 7:
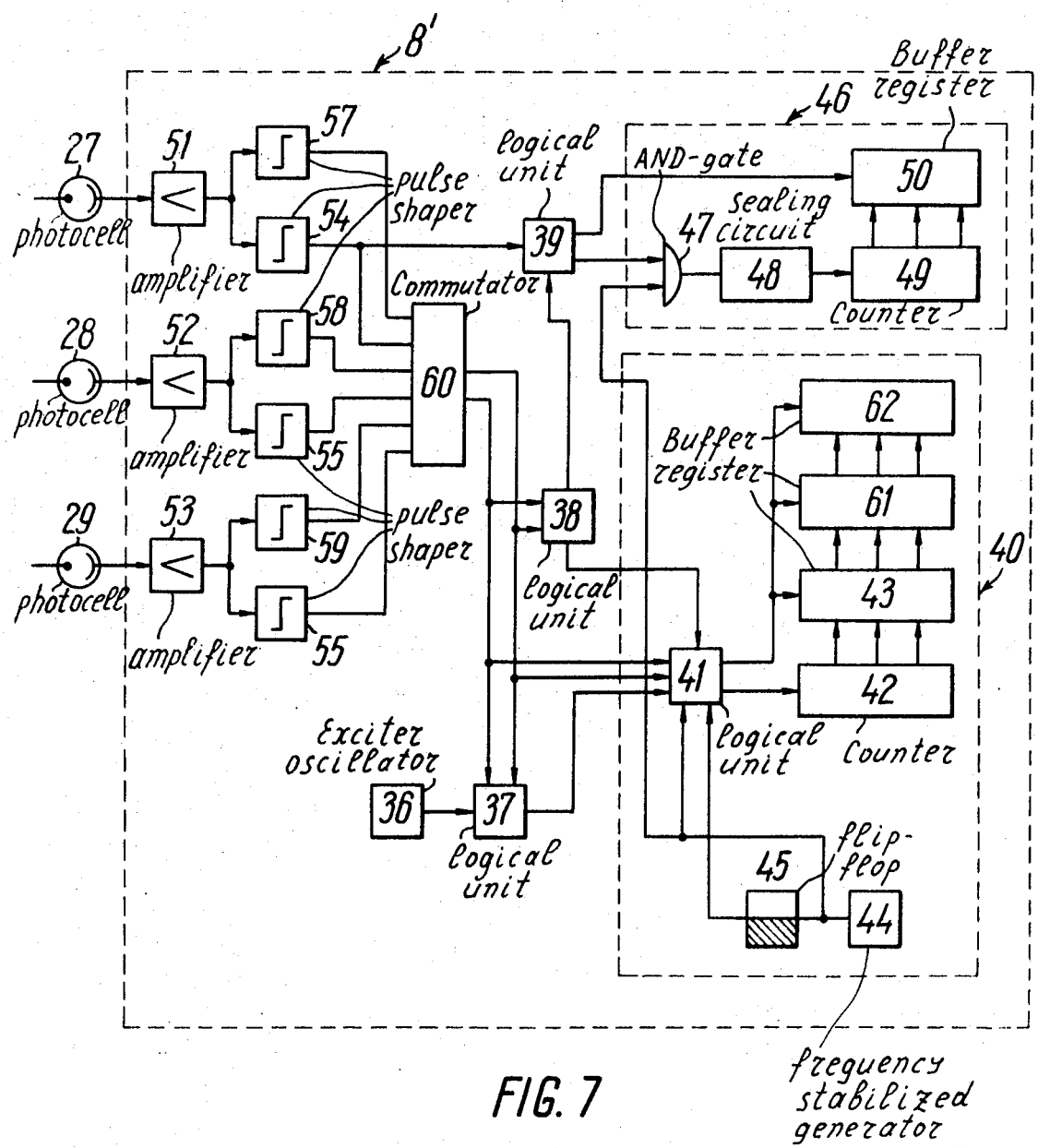
Figure 8:
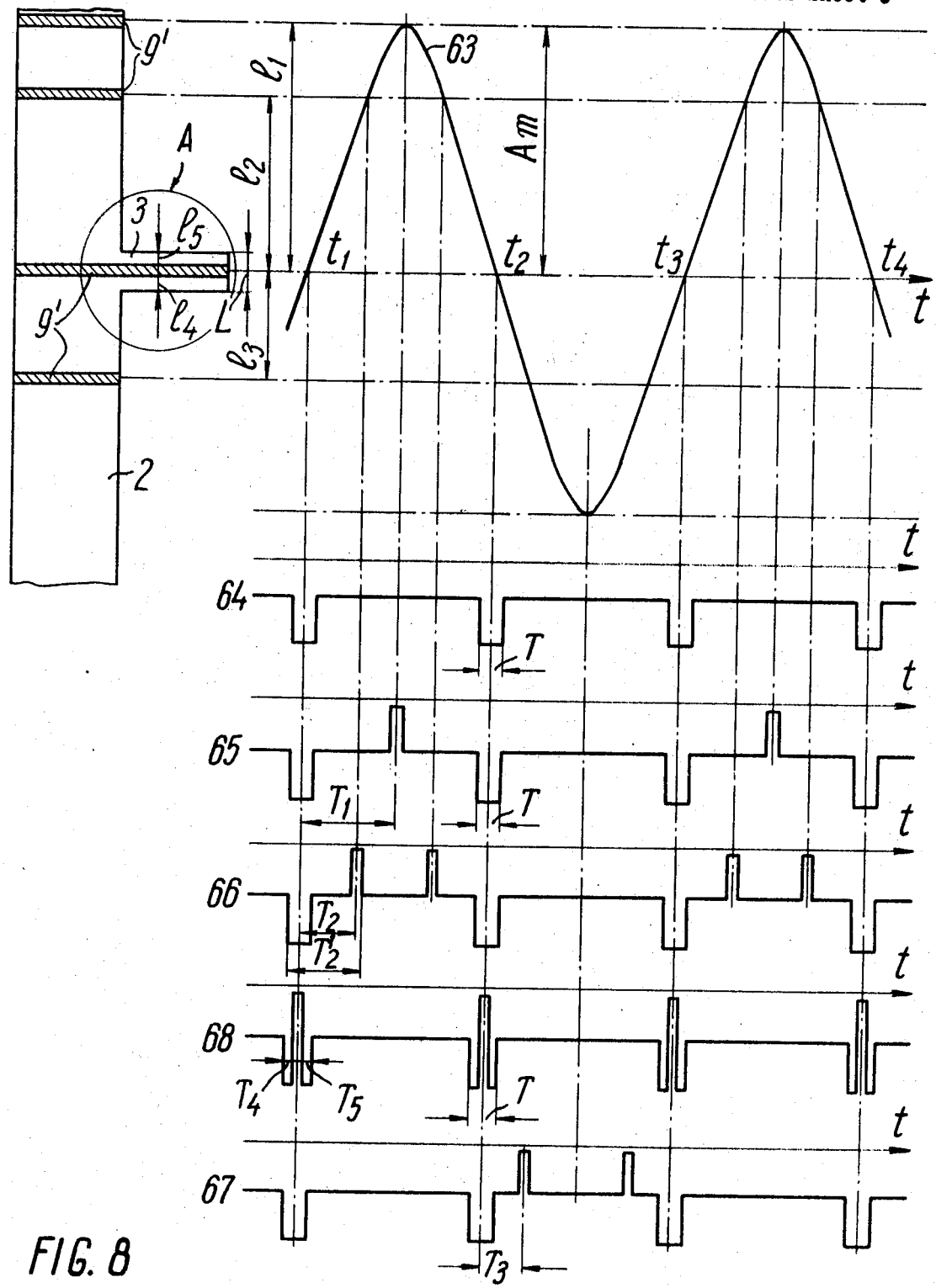
Figure 12:
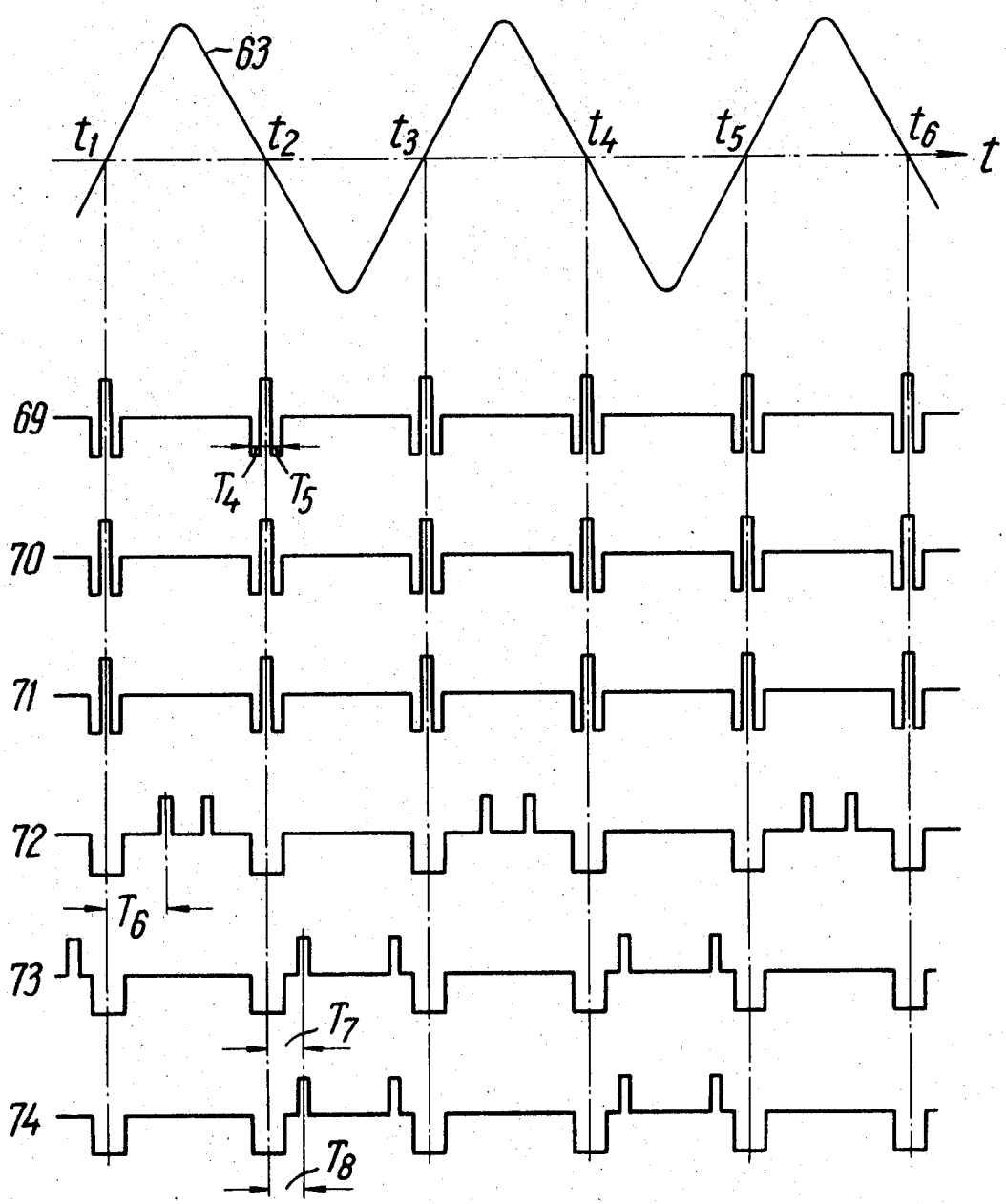

FIGS. 5a and b are respective top and side elevations of the prismatic image-turning system in the microscope of FIG. 3;

FIG. 6 is a diagram of the electronic measuring device of the microscope as shown in FIG. 1;

FIG. 7 is a diagram of the electronic measuring device of the microscope as shown in FIG. 3;

FIG. 8 is a diagram of the output signals of the microscope as shown in FIG. 1;

FIG. 9 shows section A of FIG. 8 on an enlarged scale;

FIG. 10 shows three diaphragms with intermediate images of reference lines or dashes when the optical axes of the microscope of FIG. 3 are superimposed with the axes of the reference mark;

FIG. 11 ditto with a prismatic image-turning system;

FIG. 12 is a diagram of the output signals of the microscope as shown in FIG. 3;

FIG. 13 shows three diaphragms with base slits in case the position of the reference mark in the field of view of the microscope as shown in FIG. 3 is arbitrary; and FIG. 14 ditto with the prismatic image-turning system.

According to one possible embodiment of the invention the photoelectric microscope comprises an objective 1 (FIG. 1) behind which, along the light path, there is installed a diaphragm 2 with a narrow base slit 3 whose axis is on the optical axis of the photoelectric microscope. Installed behind diaphragm 2 are a second objective 4, a mirror vibrator 5 and a photocell 6 with a slit diaphragm 7. The photoelectric microscope is also provided with an electronic measuring device 8. A reference line or dash 9 whose axis position is determined with respect to the optical axis of the photoelectric microscope is illuminated by a light source 10 through the agency of a condenser 11. The reference line 9 and the optical axis of the microscope are perpendicular to one another as shown in FIG. 1.

Figure 2:
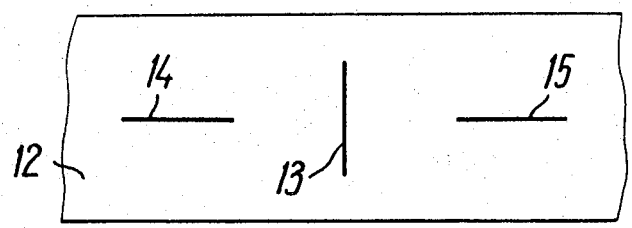
FIG. 2 shows a reference mark for alignment of the photoelectric microscope, according to the invention.

According to a second embodiment of the invention the photoelectric microscope for determining the position of the reference mark made on the surface of a body 12 (FIG. 2) and comprising three reference lines or dashes of which one line, viz., line 13, is perpendicular to the other two reference lines 14 and 15, incorporates, as shown in FIG. 3, an objective 1, behind which along the light path there are installed three diaphragms 16, 17 and 18 (FIG. 4) with base slits 19, 20 and 21 combined by one mask 22. The axes of said slits intersect respective optical axes of the photoelectric microscope.

Base slits 19, 20 and 21 are arranged so that the axis of one base slit 20 is perpendicular to the axes of the other two slits 19 and 21.

On mask 22 with diaphragms 16, 17 and 18 there is located a prismatic image-turning system constituted by four rectangular prisms 23, 24, 25 and 26 (FIGS. 5a and b) behind which along the light path there is installed a second objective 4 (FIG. 3), a mirror vibrator 5, three photocells 27, 28 and 29 with slit diaphragms 30, 31 and 32. In FIG. 3 the plane of diaphragms 30, 31 and 32 is shown to be conventionally turned through 90°.

The photoelectric microscope according to a second embodiment of the invention is also provided with an electronic measuring device 8'.

The electronic measuring device 8 comprises an amplifier 33 (FIG. 6), a pulse shaper 34 to shape pulses from the image of base slit 3 of the diaphragm 2, pulse shaper 35 to shape pulses from the image of the reference line or dash 9, an exciter oscillator 36 of mirror vibrator 5, a logical unit 37 adapted to determine the (left, right) position of the reference line or dash 9 with respect to the optical axis, a logical unit 38 adapted to determine the moment when the image of reference line or dash 9 is within the base slit 3 of diaphragm 2 and outside it, a logical unit 39 serving to separate the shaped pulse obtained from the image of the base slit 3 of diaphragm 2, a digital computing device 40 comprising a logical unit 41 which serves to separate shaped pulses obtained from the image of the base slit of diaphragm 2 and from the image of the reference line 9, it being required to measure the time intervals between said pulses as well as relationships therebetween; a reversible counter 42, a buffer register 43 for decimal numeric display of the results obtained when measuring the time intervals and relationships therebetween, a frequency-stabilized generator 44 of measuring pulses, and a flip-flop 45.

The electronic measuring device 8 also comprises a circuit 46 for determining the value of one measuring pulse in linear units, composed of an AND-gate 47, a scaling circuit 48, a counter 49, a buffer register 50 for decimal numeric display of the number of measuring pulses per unit of length.

The electronic measuring device 8', as shown in FIG. 7, differs from the abovedescribed electronic measuring device 8 in that it comprises three amplifiers 51, 52 and 53 and respective pulse shapers 54, 55 and 56 to shape pulses from the images of the base slits 19, 20 and 21 of diaphragms 16, 17 and 18 and pulse shapers 57, 58 and 59 to shape pulses from the images of the reference lines or dashes 13, 14 and 15 in each diaphragm 16, 17 and 18, and also in that it is provided with a commutator 60.

A digital computing device 40' differs from digital computing device 40 in that it has three buffer registers 43, 61 and 62 for decimal numeric display of the results of measuring time intervals and relationships between them, which determine the position of reference lines or dashes 13, 14 and 15 with respect to the optical axes.

The principle of operation of the photoelectric microscope according to the first embodiment of the invention, is as follows.

Reference line or dash 9 illuminated by light source 10 by means of condenser 11 is projected by objective 1 into the plane of diaphragm 2. Objective 4 forms a superimposed image of diaphragm 2 together with an intermediate image of reference line or dash 9 in the plane of slit diaphragm 7 whose axis is parallel to the image of the axis of the base slit 3 of diaphragm 2. This superimposed image is scanned by mirror vibrator 5 before photocell 6 in a direction perpendicular to the axis of slit diaphragm 7.

In the process of scanning, photocell 6 produces a signal, which is a train of pulses which are characteristic of the time-base scanned image of diaphragm 2 with base slit 3 and the position of the image of reference line or dash 9 in the plane of diaphragm 2 with respect to the axis of its base slit 3.

Shown in FIG. 8 is a diagram of output signals for various positions of image 9' of the reference line or dash 9 in the plane of diaphragm 2 with base slit 3 for sine scanning curve 63 of vibrator 5. During one scanning period of vibrator 5 the image of diaphragm 2 with base slit 3 together with the intermediate image of reference line or dash 9 passes twice before the slit diaphragm 7 of photocell 6.

When the position of reference line or dash 9 is outside the field of view of the photoelectric microscope, said field of view being determined by the magnitude of the scan amplitude $A_m$ in the plane of slit diaphragm 7, transferred into the plane of the reference line or dash 9 with due account of the magnification of objectives 4 and 1, an output signal 64 of photocell 6 is characteristic of the time-base scanned image of diaphragm 2. Here negative pulses of duration T are obtained from the image of base slit 3 whose width equals L.

When reference line or dash 9 happens to be on the border of the field of view of the photoelectric microscope, i.e., when its image 9' is at a distance $l_1$ to the right of the axis of the base slit 3 of diaphragm 2, in the output signal 65 of photocell 6 there appear positive pulses from the image 9' of the reference line during scanning half-preiods $t_1$–$t_2$ and $t_3$–$t_4$, i.e. when vibrator 5 is to the right from the center of its oscillations. The distance $l_1$ between the axis of base slit 3 and the axis of the image 9' of the reference line is characterized by time interval $T_1$ between the middles of the pulses obtained from the image of the base slit 3 of diaphragm 2 and the image 9' of the reference line. As the reference line further approaches the optical axis, i.e. when the image 9' of the reference line is at a distance $l_2$ to the right from the axis of the base slit 3 of diaphragm 2, during said half-periods of scanning the image of reference line 9 passes twice in front of the slit diaphragm 7 of photocell 6 and in its output signal 66 during these half-periods there appear two positive pulses from the image of the reference line. The value $l_2$ is characterized by time interval $T_2$. When reference line 9 is to the right from the optical axis of the microscope, when the image 9' of said reference line is to the left from the axis of the base slit 3 of diaphragm 2 at a distance $l_3$, in the output signal 67 of photocell 6 positive pulses from the image of reference line 9 appear only during the half-period of scanning $t_2$–$t_3$, and the distance $l_3$ is characterized by time interval $T_3$.

Thus, when the image of reference line 9 is outside the base slit 3 of diaphragm 2 the distance value between the axes of the image 9' of the reference line 9 and the axis of base slit 3 is characterized by the time interval between the middles of pulses from the borders of the base slit 3 and the image 9' and the direction of departure (to the left or to the right) of the image of reference line 9 with respect to base slit 3 is determined by the half-periods of scanning during which there appear positive pulses from the image 9' of reference line 9.

When measuring said linear dimensions in the plane of reference line 9, i.e., when determining the distance between the axis of reference line or dash 9 and the optical axis of the photoelectric microscope, it is necessary to take into account the magnification of objective 1, which forms a reverse image of reference line or dash 9 in the plane of diaphragm 2.

With the appearance of the image 9' of the reference line in the base slit 3 of diaphragm 2 there becomes available additional information for determining the position of the axis of the reference element with respect to the optical axis. In this case the distance value $\delta_e$ (FIG. 9) between the axis of the image 9' of the reference line or dash and the optical axis is determined from the relation $$\delta_e = \frac{l_4 - l_5}{2}$$

the axis of base slit 3 serving, as pointed out above, as the optical axis and $l_4$ and $l_5$ being the distances between the borders of the base slit 3 of diaphragm 2 and the borders of the image 9' of reference line or dash 9.

The sign of $\delta_e$ determines the direction of departure of the axis of the image of reference line or dash 9 from the optical axis, i.e.

when $\delta_e > 0 (l_4 > l_5)$ the axis of reference element or line 9 is located to the left from the optical axis;

$\delta_e = 0 (l_4 = l_5)$ the axis of the reference element coincides with the optical axis;

$\delta_e < 0 (l_4 < l_5)$ the axis of the reference element is located to the right from the optical axis.

Thus the alignment of the axis of the photoelectric microscope with the axis of reference line 9 is effected by means of symmetrical equalization of the values $l_4$ and $l_5$, this being similar to the symmetrical equalization method employed when alignment with the axis of the reference mark in a bisector.

In signal 68 (FIG. 8) from the output of photocell 6, in case the image 9' of reference line or dash is in the plane of base slit 3, the pulse from the image of slit 3 is split into two pulses and the position of the axis of image 9' of reference line or dash 9 with respect to the axis of the base slit 3 of the diaphragm 2 is characterized by the relation $\delta_t$ between time intervals $T_4$ and $T_5$ of pulses from the borders of the base slit 3 of diaphragm 2 and from the image of reference line or dash 9, i.e.

$$\delta_t = \frac{T_4 - T_5}{2}$$

If $\delta_t > 0 (T_4 > T_5)$ the axis of reference line or dash 9 is located to the left from the optical axis;

$\delta_t = 0 (T_4 = T_5)$ the axis of reference line or dash 9 coincides with the optical axis;

$\delta_t < 0 (T_4 < T_5)$ the axis of reference line or dash 9 is located to the right from the optical axis.

Thus the absolute value of the above relation $\delta_t$ between the time intervals $T_4$ and $T_5$ is characteristic of the distance between the optical axis and the axis of reference line or dash 9, and the sign of $\delta_t$ determines the direction in which the axis of said reference line or dash deviates from the optical axis.

In case of discrete measurement of time intervals $T_4$ and $T_5$ by means of frequency-stabilized generator 44 of measuring pulses we obtain $$\delta_t = \frac{N_4 - N_5}{2} \Delta \tau$$

where $\Delta \tau$ is an elementary time interval between the measuring pulses;

$N_4$ and $N_5$ are the number of measuring pulses comprised within the time pulses $T_4$ and $T_5$, respectively.

The photoelectric microscope, according to the invention, ensures high stability of the optical axis of the microscope and in the case of sine scanning can tolerate considerable drifts of the center of escillations of vibrator 5 with respect to the axis of the slit diaphragm 7 of photocell 6 so that no drift of the optical axis of the photoelectric microscope occurs, since for an unequivocal setting of the optical axis of the photoelectric microscope by the axis of the base slit 3 of diaphragm 2 it is required that constant velocity of scanning of the image of slit 3 before photocell 6 should be ensured.

In case of sinusoidal scanning, where $A_m >> L$ (FIG. 8) there exists a considerable linear scanning interval, i.e. an interval where the velocity of scanning is constant, and within this interval the center of oscillations of vibrator 5 may drift with respect to the axis of slit diaphragm 7 without causing the drift of the optical axis of the photoelectric microscope.

If a rotary drum is used as the mirror vibrator where the scanning velocity within the entire field of view of the photoelectric microscope is constant, the scanning being linear, the optical axis of the microscope is unequivocally set by the axis of the base slit of the diaphragm and all linear measurements of the position of the axis of the reference line or dash in the field of view are unequivocally transition from $\delta_t$ to $\delta_e$ and from $T_1$, $T_2$ and $T_3$ to $l_1$, $l_2$ and their relationships between the pulses from the borders of the image of the base slit and the image of the reference line or dash.

For time-to-length measurement conversion, i.e. for transition from $\delta_t$ to $\delta_e$ and from $T_1$, $T_2$ and $T_3$ to $l_1$, $l_2$ and $l_3$, the value of one measuring pulse is automatically determined in linear units with the employment as a scaling element of the width L of the base slit 3 of diaphragm 9 transferred into the plane of reference line 9 taking into account the magnification of objective 1, by the number of measuring pulses during the time T, i.e. during the time of scanning of the image of base slit 3 before photocell 6.

Since $$T = N \Delta \tau, \quad \tau = \frac{L}{\beta \cdot N} = \frac{L'}{N}$$

where

L is the width of the base slit 3 of diaphragm 2;
$\beta$ is the magnification factor of objective 1;
N is the number of measuring pulses during the time T;
L' is the width of the base slit 3 of diaphragm 2, transferred into the plane of reference line or dash 9.

The value of K reciprocal to $\Delta \tau$, i.e.

$$K \frac{1}{\Delta \tau} = \frac{N}{L}$$

is equal to the number of measuring pulses per unit of length.

Since L and $\beta$ are constant values and the value of N is determined by the velocity or scanning which can hardly be stabilized with a high accuracy, the use of $L'/N$ as the linear value of one measuring pulse makes it possible to make the evaluation in linear units of the distance between the axis of reference line or dash 9 and the optical axis independent of the velocity of scanning determined by the amplitude and frequency of scanning of vibrator 5.

The information concerning the position of the axis of reference line or dash 9 with respect to the optical axis of the photoelectric microscope is processed by means of electronic measuring device 8.

The output pulses of photocell 6 are amplified by amplifier 33 and then fed to the inputs of shapers 34 and 35, of which one, viz., shaper 34 constantly separates a pulse from the image of the base slit 3 of diaphragm 2 and shapes it into a pulse of a constant amplitude, the duration thereof being equal to the time of scanning of the image of the slit 3 of diaphragm 2 before photocell 6. The other shaper 35 constantly separates and shapes a pulse from the image of reference line or dash 9, converting said pulse into that with a constant amplitude, the duration of said pulse being equal to the time of scanning of the image of reference line or dash 9 before photocell 6.

The pulses from the images of the base slit 3 of diaphragm 2 and of reference line or dash 9 thus shaped are then subjected to further information processing concerning the value of time intervals and their relationships.

Logical unit 37 whose input is fed with the sinusoidal voltage of the exciter oscillator 36 of vibrator 5 and with the output pulses of shaper 35 from the image of reference line or dash 9 during the voltage half-periods of the exciter oscillator 36, i.e. during the scanning half-periods of vibrator 5 when the pulses from the image of reference line or dash 9 arrive, determines the direction of departure of reference line or dash 9 with respect to the optical axis. Logical unit 37 produces corresponding output potentials, as to the position of reference line or dash 9 being to the left or to the right from the optical axis of the photoelectric microscope.

Logical unit 38 determines the position of the image of reference line or dash 9 to the base slit 3 of diaphragm 2, i.e. it determines the moment of the image of reference line or dash 9 being within base slit 3 and outside it. The potential indicating that the image 9' of reference line or dash 9 is within base slit 3 is produced with the appearance of signal 68 with split pulses from the image of base slit 3.

The information from logical unit 37 as to the position of reference line or dash 9 with respect to the optical axis and the information from logical unit 38 are fed to logical unit 41 of digital computing device 40 which, by the potential from logical unit 39 adapted to determine the position of the image of reference line or dash 9 within base slit 3, calculates with the aid of reversible counter 42 the relationships between the time intervals $T_4$ and $T_5$, i.e.

$$\delta_t = \frac{T_4 - T_5}{2}$$

and, in the case of the image of reference line 9 happens to be outside base slit 3, calculates the time intervals $T_1$, $T_2$ and $T_3$ between the middles of pulses from the image of the base slit 3 of the diaphragm 2 and the image of reference line or dash 9. For calculating $\delta_t$ logical unit 41 when measuring $T_4$ sets reversible counter 42 for summation and when measuring $T_5$, for subtraction. Output pulses from flip-flop halving the frequency of the generator 44 of measuring pulses so as to perform the operation of division by two when calculating the relation $$\delta_t = \frac{T_4 - T_5}{2}$$

For calculating time intervals $T_1$, $T_2$ and $T_3$ between the middles of pulses from the images of base slit 3 and of reference line or dash 9 when the image of reference line or dash 9 is outside base slit 3, time interval $T_2'$ is measured as shown in FIG. 8 at 66, i.e. there is measured the time interval between the leading edge of the pulse from the image of base slit 3 and the trailing edge of the pulse from the image of reference line or dash 9. When measuring the duration T of the pulse from the image of base slit 3 and of the pulse from the image of reference line or dash 9, measuring pulses from the output of flip-flop 45 are employed for setting the middles of said pulses from the images of base slit 3 and of reference line or dash 9, and the remaining time interval between the edges of said pulses is measured by means of measuring pulses arriving from the output of generator 44. The time intervals $T_1$, $T_2$, $T_3$, $T_4$ and $T_5$ and their relationships having been calculated by reversible counter 42, logical unit 41 transmits the information from the reversible counter to buffer register 43 for decimal numeric display.

Logical unit 39 continuously separates a pulse of duration T from the image of the base slit 3 of diaphragm 2, no matter whether the image of reference line or dash 9 is outside slit 3 or within it.

The pulse of duration T is fed to one input of AND-gate 47, the other input thereof being fed with measuring pulses from generator 44. Thus to the input of scaling circuit 48, whose scaling factor is equal to the width of the base slit 3 of diaphragm 2 transferred into the plane of reference line or dash 9 with the magnification of objective 1 taken into account, there arrives the shaped pulse from the image of base slit 3 which is a pack of measuring pulses.

The overflow pulses from the output of scaling circuit 48, i.e. the result of division of the number N of the measuring pulses contained in the pulse of duration T from the image of the base slit 3 of diaphragm 2 by the width of base slit 3 transferred into the plane of reference line or dash 9, are registered by counter 49, the number of the overflow pulses arrived to the input of counter 49 being equal to the number of measuring pulses per unit length. Therefore, scaling circuit 48 in combination with counter 49 calculates the relation:

$$K = \frac{N}{L'} = \frac{1}{\Delta \tau}$$

The above relation having been calculated, logical unit 39 transmits the information from counter 49 to buffer register 50 for decimal numeric display.

Buffer register 50 constantly displays numerically the number of measuring pulses per unit length (micron, microinch, etc.), the reciprocal value of the number being a value of one measuring pulse in linear units for a given value of the field of view of the photoelectric microscope and the frequency of scanning of vibrator 5.

Therefore the photoelectric microscope of the present invention makes it possible to effect automatic scaling when converting time measurements into linear ones and to obtain reading between the axis of the reference line or dash and the optical axis of the microscope independent of the magnitude of the field of view of the microscope, the constant width of the base slit of the diaphragm serving as the scaling element.

The measurement of said time intervals $T_4$ and $T_5$ may also be made by analogue methods.

The principle of operation of the photoelectric microscope according to the second embodiment is similar to that of the photoelectric microscope made according to the first embodiment thereof.

The difference between the two embodiments is that the reference mark, made on the surface of body 12 illuminated by the source of light 10 through the agency of condenser 11 is projected by means of objective 1 onto the plane of three diaphragms 16, 17 and 18 with their respective base slits 19, 20 and 21.

Objective 4 with the aid of the prismatic image-turning system forms a superimposed image of said diaphragms with their base slits and of intermediate images of reference lines or dashes 13, 14 and 15 in the plane of the slit diaphragms 30, 31 and 32 of photocells 27, 28 and 29.

The axis of the base slit 20 of one of diaphragms, viz., that of diaphragm 17, being perpendicular to the axes of the base slits of two other diaphragms 16 and 18, to analyze the position of the images 13', 14' and 15' (FIG. 10) of reference lines or dashes 13, 14 and 15 with respect to the axes of said base slits which are the optical axes of the photoelectric microscope, scanning should be effected in two directions perpendicular to each other as indicated by arrows B and C so that the axes of slit diaphragms 30, 31 and 32 be parallel to the axes of base slits 19, 20 and 21.

In the photoelectric microscope described herein, however, scanning is effected in one direction only and with only one mirror vibrator 5 with the aid of the prismatic image-turning system which comprises four rectangular prisms, of which two prisms, 23 and 26, transfer the image of two diaphragms 16 and 18, the axes of whose base slits are parallel, together with the images 14' and 15' of reference lines or dashes 14 and 15 into a perpendicular plane, and the other two prisms, 24 and 25, transfer the image of the third diaphragm 17, the axis of whose base slit 20 is perpendicular to the axes of the base slits 19 and 21 of the other two diaphragms 16 and 18, together with the image 13' of reference line or dash 13 into the same perpendicular plane and simultaneously turn said image in said plane through 90°. Therefore objective 4 forms images of the diaphragms 30, 31 and 32 with their base slits together with the intermediate image of the reference lines or dashes in the plane of said three diaphragms so that the axes of the base slits 19, 20 and 21 of all diaphragms are parallel with respect to each other and with respect to the axes of slit diaphragms 30, 31 and 32, whereby it becomes possible to effect scanning in one direction only along arrow C, as shown in FIG. 11, by means of one mirror vibrator 5. When scanning superimposed images of diaphragms 16, 17 and 18 with base slits 19, 20 and 21 together with intermediate images of reference lines or dashes 13, 14 and 15 by means of photocells 27, 28 and 29, the output signals produced by each of said photocells are trains of pulses which characterize time-base scanned images of respective diaphragms 16, 17 and 18 with base slits 19, 20 and 21 and the position of images of reference lines or dashes 13, 14 and 15 with respect to the axes of said base slits.

The photoelectric microscope described herein, according to the second embodiment thereof, operates as three separate photoelectric microscopes made according to the first embodiment of the present invention, i.e. it is essentially a three-channel photoelectric microscope, in which each of the channels determines the position of the respective reference line or dash relative to its optical axis in the manner similar to the operation of the abovedescribed one-channel photoelectric microscope.

The equality of time intervals $T_4$ and $T_5$ in signals 69, 70 and 71, as shown in FIG. 12, for each channel is indicative of the axes of the photoelectric microscope being aligned with the axes of the reference lines or dashes 13, 14 and 15 of the reference mark.

The position of the images 14', 13' and 15' (FIGS. 13 and 14) of reference lines or dashes 14, 13 and 15 in the plane of diaphragms 16, 17 and 18 with respect to the optical axes is characterized by time intervals $T_6$, $T_7$ and $T_8$, as shown in FIG. 12 by signals 72, 73 and 74, between the middles of pulses from the images of the base slits 19, 20 and 21 and of reference lines or dashes 14, 13 and 15, the direction of departure (to the left or to the right) from the optical axes being determined by the half-periods of scanning $t_1-t_2-t_3-t_4-t_5-t_6$, when in each channel there appear pulses from the images of reference lines or dashes 14, 13 and 15.

The information as to the position of reference lines or dashes 14, 13 and 15 with respect to the optical axes is processed by electronic measuring device 8'. The output pulses of photocells 30, 31 and 32 are amplified by amplifiers 51, 52 and 53 and then from the output of each amplifier fed to the inputs of shapers 54, 55 and 56 which constantly separate and shape pulses from the images of base slits 19, 20 and 21 in each channel, as well as to the inputs of shapers 57, 58 and 59 which constantly separate and shape pulses from the images of reference lines or dashes 14, 13 and 15.

The output pulses of shapers 54, 55, 56, 57, 58 and 59 are fed to commutator 60 which successively sends the shaped pulses from the images of the base slits of lines or dashes from each cannel to logical units 37 and 38 and a digital computing device 40', the operation of which is similar to that of the abovedescribed units in electronic measuring device 8.

The information as to the position of reference lines or dashes 14, 13 and 15 in each channel, registered in reversible counter 42 is transmitted by logical unit 41 via the potentials of commutator 60 into the buffer registers 43, 61 and 62 for decimal numeric display.

Logical unit 39 constantly separates and shapes pulses from the image of the base slit 19 of diaphragm 16 so as to make the scaling element constant, i.e. the width L of the base slit of said diaphragm, which is used to determine the value of one measuring pulse in linear units when determining the positions of reference lines or dashes 14, 13 and 15 in the three channels.

Buffer register 50 constantly numerically displays the number of measuring pulses per unit length (micron, microinch, etc.) whose reciprocal is the value of one measuring pulse in linear units, said reciprocal value serving for converting the information displayed by buffer registers 43, 61 and 62 as to the position of reference lines or dashes 14, 13 and 15 in each channel with respect to the optical axes into linear units.

The photoelectric microscopes described hereinabove feature constant optical axes independent of the position of the centre of oscillations of the vibrator, which fact increases the accuracy of their operation and extends the field of application.

Moreover, the photoelectric microscopes of the present invention are capable of determining not only the moment of alignment with the axis of the reference line or dash, but also make it possible to determine the position of the axis of the reference line or dash relative to the optical axis of the photoelectric microscope in its field of view, the output information as to the position of the reference line or dash being represented in linear units and in a numeric code. All these factors eliminate the necessity of the human operator participation in the process of measurements and make it possible for the abovedescribed photoelectric microscopes to be employed in various automatic and programmed devices.

Though the present invention is described in connection with preferred embodiments thereof, it is apparent that various modifications can be made without departing from the spirit and scope of the invention, as those skilled in the art will easily understand. Such changes and modifications should be considered as falling within the true spirit and scope of the invention as defined in the appended claims.

What is claimed is:

1. A photoelectric microscope comprising: means for producing a light path along an optical axis, an objective on said axis; at least one diaphragm provided with a base slit whose axis intersects said optical axis, said diaphragm being installed along the light path behind said objective, said objective focusing the image of a reference line or dash into the plane of said base slit; a second objective installed behind said diaphragm along the light path; a mirror vibrator, installed along the light path behind said second objective; at least one photocell having a slit diaphragm in whose plane there is formed a superimposed image of said diaphragm with the base slit and the reference line or dash, said superimposed image being projected by said second objective and scanned by said vibrator in front of said photocell; an electronic measuring device connected to the output of the photocell to measure time intervals between the pulses from the borders of said base slit of said diaphragm and of the image of said reference line or dash as well as to measure the relation between said time intervals, said pulses arriving from the output of said photocell and being indicative of the position of the axis of said reference line or dash with respect to the optical axis.

2. A photoelectric microscope as defined in claim 1, wherein three diaphragms provided with base slits are installed, these base slits being arranged so that the axis of one of them is perpendicular to the axes of the other two of said diaphragms, a prismatic image-turning system installed behind said diaphragms in front of said second objective, said prismatic image-turning system comprising four rectangular prisms, two of which transfer images of two said diaphragms with parallel axes of said base slits together with images of said reference lines or dashes into a perpendicular plane and the other two said prisms transfer the image of the third said diaphragm, whose axis is perpendicular to the axes of the other two said base slits of said diaphragms, together with the image of said reference line or dash into said perpendicular plane simultaneously turning it through 90°.

3. A photoelectric microscope as set forth in claim 1, wherein in said electronic measuring device, in the case of measuring time intervals between the pulses in discrete form, a circuit is provided to determine the length of one measuring pulse, said circuit incorporating a scaling circuit, the input thereof being fed with a shaped pulse from the photocell of an image of one of said base slits of said diaphragm which is a pack of measuring pulses, and a counter whose input is fed with overflow pulses of said scaling circuit, the scaling factor of said scaling circuit being equal to the width of said base slit of said diaphragm transferred into the plane of said reference line or dash, and the number of pulses fed to the input of said counter being equal to the number of measuring pulses per unit length.

References Cited

FOREIGN PATENTS

| 441,784 | 1/1968 | Switzerland | 356—170 |
| 1,233,614 | 2/1967 | Germany | 356—170 |

RONALD L. WIBERT, Primary Examiner

P. K. GODWIN, Assistant Examiner

U.S. Cl. X.R.
250—237; 356—172